Figure 3:
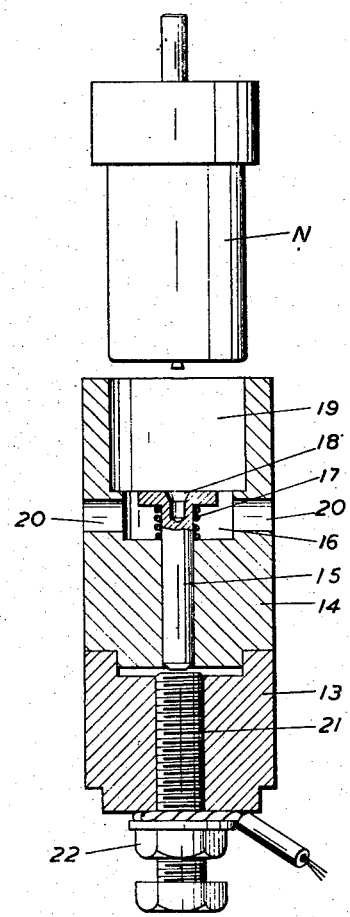

July 30, 1957 — L. HARTRIDGE — 2,800,791
APPARATUS FOR TESTING AND TIMING FUEL INJECTION PUMPS
Filed Sept. 14, 1953
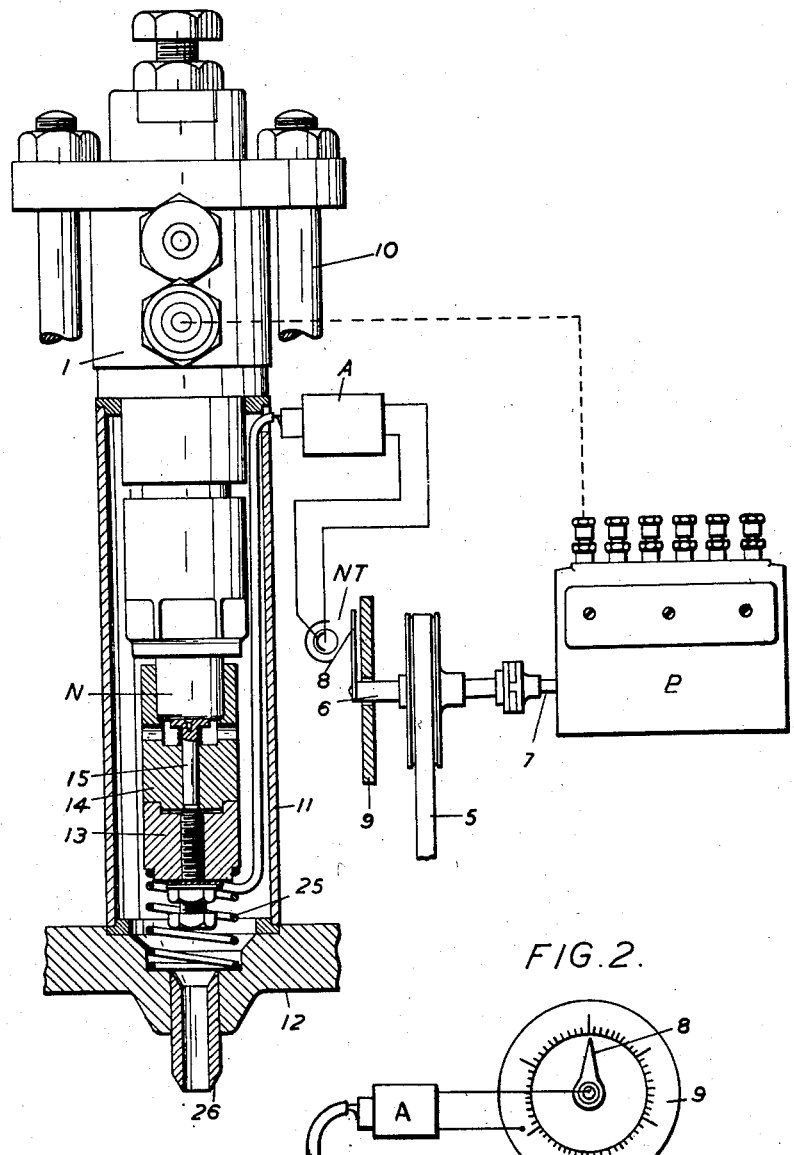
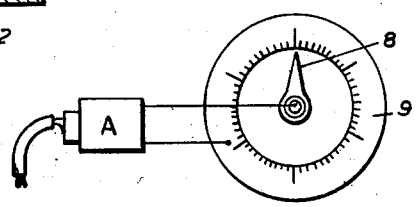
Inventor
Leslie Hartridge, July 30, 1957 L. HARTRIDGE 2,800,791
APPARATUS FOR TESTING AND TIMING FUEL INJECTION PUMPS
Filed Sept. 14, 1953 3 Sheets-Sheet 2

Inventor
Leslie Hartridge
By

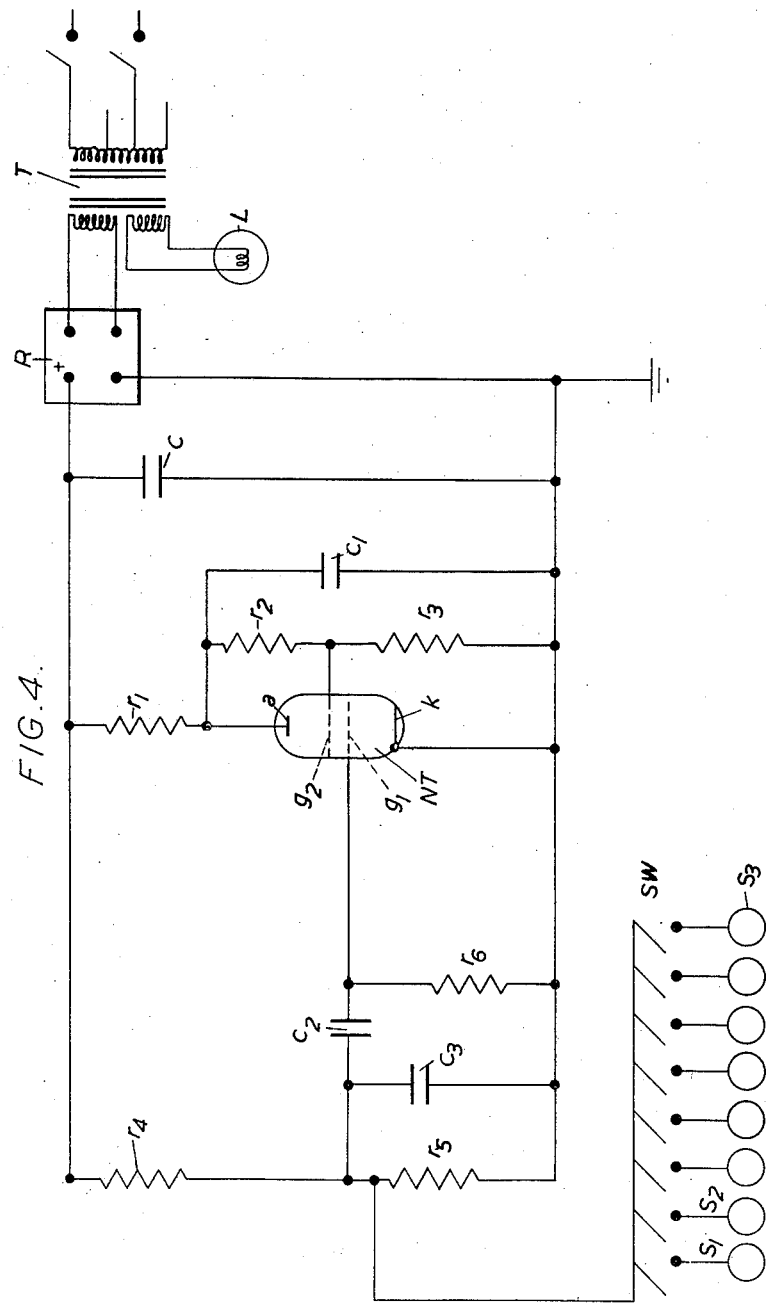

United States Patent Office 2,800,791
Patented July 30, 1957

2,800,791

APPARATUS FOR TESTING AND TIMING FUEL INJECTION PUMPS

Leslie Hartridge, Buckingham, Buckinghamshire, England

Application September 14, 1953, Serial No. 379,950

Claims priority, application Great Britain September 23, 1952

10 Claims. (Cl. 73—119)

This invention has reference to a new or improved means for testing, phasing or timing the fuel pump or pump elements of a multi-element fuel pump for compression ignition engines to ensure that fuel injection occurs at the precise and optimum point or points in the cycle of operation of any appropriate engine with which the pump may be associated. The features of the invention are also applicable to the testing of injector nozzles for use with such fuel pumps.

Apparatus for testing, phasing or timing a pump or pump unit consists, according to the invention, in utilising the initial force of the liquid ejected at the nozzle of a test injector fed by the pump or pump unit to show by stroboscopic means, the position of the shaft of the pump or pump unit when delivery occurs. The stroboscopic means may cause momentary illumination of an indicator on the pump shaft at every delivery by the injector, such illumination being obtained by causing contact means associated with the test nozzle and directly impinged upon by the delivery spray, to control an electric circuit operating a gaseous discharge light source, such as a neon tube, so that said source or tube illuminates a pointer on the said shaft movable over a fixed scale (or conversely a rotating scale moving against a fixed reference marking), permitting the point of injection to be shown by stroboscopic action. Thus because the initial force of the ejected liquid i. e. the force of the sprayed liquid at the moment of commencement of ejection of the liquid from the injector, is used to initiate the firing of the neon tube or the like, the exact angular position of the pump shaft as shown by the pointer and scale at the moment of commencement of an injection can be ascertained and where necessary corrected by adjustment of the pump in the usual way.

The means according to the invention comprises a spring loaded plunger adapted to be located immediately in the path of liquid ejected at the spray nozzle of a test injector, a mounting being provided for supporting the said plunger in relation to the injector and the said plunger either comprising or being adapted to displace an electrical contact which contact, when the plunger is displaced, cooperates with another contact to initiate the firing of the discharge device or tube.

Preferably the plunger and its mounting are displaceably mounted in a housing to which an injector is adapted to be fitted and said mounting together with the associated contact means are slidably displaceable against spring means so as yieldingly to engage the nozzle end of the injector when fitted into place. The plunger mounting incorporates relief ports for evacuating the sprayed liquid which is delivered towards the plunger and said liquid enters the housing surrounding the mounting and the injector and is evacuated therefrom through suitable relief passages.

Preferably the contact means forming part of or associated with the mounting are adapted to be connected to a discharge tube or device of the type having a trigger electrode or they may be associated with an amplifier which in turn causes the illumination of a neon tube or like discharge device of the conventional type, the device, in either case, being suitably positioned to illuminate a pointer mounted on the pump shaft and rotating over a fixed scale, and to perform the stroboscopic illumination of said pointer so that the apparent position or positions of the pointer is illuminated by the neon tube or the like to display the instant at which injection occurs and permits said instant to be determined in relation to the operational characteristics of the pump or of the pump unit i. e. to ascertain for example that injection occurs at some predetermined point of the pump cycle for example precisely at top dead centre.

A preferred embodiment of the invention is shown in greater detail by way of example on the accompanying drawings in which:

Fig. 1 is a general view showing diagrammatically the arrangement of a multi-unit pump and of the parts associated therewith including a discharge tube illuminating device for a pointer associated with the pump shaft, Fig. 2 is a sketch illustrating the arrangement of the pointer and of the scale over which it moves, Fig. 3 is a detailed view showing the arrangement of the plunger mounting, and Fig. 4 is a circuit diagram showing a neon tube circuit which may be used in conjunction with the present application.

The method of testing the fuel injection pump according to the present invention will be best understood from a consideration of the following description showing one constructional form of the apparatus. In this apparatus and referring more particularly to Fig. 1 of the drawings P represents a pump unit under test, which in this case is shown as of the six element type, said pump being driven for test purposes by means of a belt drive 5 to a shaft 6 coupled to the pump shaft 7. A pointer 8 on the shaft 6 is rotated over (Fig. 1) or within (Fig. 2) a fixed scale ring 9 which, in one form of the invention, is adapted to be illuminated by a gaseous discharge device such as a neon tube NT. The latter is energised by the control circuit or amplifier A by contact means associated with a test or reference injector indicated in general at I. In another form of the invention, the control circuit or amplifier A may be connected directly to the pointer 8 and the ring 9 respectively, whereby a high tension spark is adapted to pass between the pointer 8 and the ring 9; the arrangement of Fig. 2 is applicable to this form.

This injector is held in the apparatus through suitable clamp means indicated in diagrammatic form at 10 which is adapted to clamp the injector against the tube 11 which in turn bears against a support plate 12 of the apparatus. The nozzle end N of the injector is engaged by a contact mounting assembly 13, 14 the components of which are fitted one to the other with a socket and spigot. The component 14 slidably supports a plunger 15 bearing against the end of the nozzle N so that at the precise instant when delivery of fuel is effected from the nozzle the plunger is displaced to actuate the contact means hereinafter described.

The plunger 15 is preferably in the form of a headed rod slidably borne in a bore of the mounting component 14, the said bore being enlarged at 16 to accommodate the head. Between the said head and the base of the enlarged part of the bore is a spring 17, preferably a light spring, tending to urge the stem of the plunger partly out of the bore in which said stem is located. The extremity of the head is preferably ground and the location of the mounting in relation to a test injector is preferably arranged to be such that when the mounting and the injector are assembled in their respective positions the ground surface of the head bears closely against the end of the injector nozzle, said head being recessed as at 18 to receive the usual projecting part of the injector needle or pintle. Where the end of the nozzle is flat the head of the plunger is also flat, but such head is preferably shaped in each case to fit closely against the end of the nozzle; for example if the latter is conical the head of the plunger includes a conical recess. The part 14 of the mounting which is to receive an injector nozzle N is further enlarged as shown at 19 to receive snugly the end of the nozzle N and lateral relief ports for the sprayed liquid are shown at 20.

The plunger 15 is thus comparable with a valve stem or jumper in that liquid cannot pass freely from the injector nozzle N until the said liquid has moved the faced end of the plunger out of contact with the nozzle. For this reason the plunger can be regarded as immediately responsive to pressure liquid issuing from the injector; and immediately liquid discharge occurs the plunger is displaced against the spring 17. The end of the plunger 15 furthest from the head is preferably used as one contact and the counter contact is mounted in the component 13 which is formed of insulating material, said counter contact preferably being carried or formed by a screw 21 having a lock nut 22 so that the gap between the two contacts can be adjusted to a predetermined small value when the nozzle N is in correct position in the enlarged part 19 of mounting 14 and the adjustment held.

It will be appreciated that immediately liquid under pressure issues from the injector nozzle N the plunger 15 is displaced lengthwise against the action of the spring 17. Such displacement brings the contact end of the plunger into engagement with the countercontact 21, the gap between the two contacts being of a small order, and the stroboscopic display is obtained substantially instantaneously with the commencement of what would be the injection period were the injector installed in an engine.

The recess 18 may be in the form of a blind bore extending lengthwise from the faced end so that this bore becomes charged with liquid during the operation of the present means. It has been found in practice that the provision of such a blind bore has the effect of avoiding rebound or chattering of the plunger and of holding it steady during the completion of the spraying period. This assists in ensuring a clear and well defined stroboscopic display.

In some cases the head of a plunger 15 may be a sliding fit in the recess 16 so that fluid pressure is maintained on the head of the plunger until such time as the plunger in its downward movement, uncovers the exhaust port or ports 20. This is another arrangement whereby the plunger is held steady throughout a spraying period. In a further arrangement with the same object in view the stem of the plunger 15 may have one or more lateral ducts communicating with the blind bore and so located that they register with exhaust ports in the mounting when the plunger is in the displaced position.

Further devices which may be employed to prevent or to assist in preventing vibration of the plunger during a spraying period comprise a rubber or like cushion between the spring and the head of the plunger and/or a rubber or like cushion included in the support for the countercontact.

As will be seen from Fig. 1 the contact mounting assembly 13, 14 is pressed uniformly upwardly in the tube 11 by means of a spring 25 engaging a preferably recessed portion of the support plate 12 of the apparatus and said recessed part communicates with a relief pipe 26 for collection of the sprayed liquid passing outwardly through the lateral ports 20 of the mounting component 14.

The method of testing with his apparatus will be readily understood: the nozzle I represents a reference or test injector by which the operation of the pump unit or of several units of the pump P can be tested, and if desired there may be a plurality of such injectors I arranged side by side and connected to the different units of the pump. When the pump is operated the injector I or each injector delivers its spray from the nozzle N, which is directed towards the plane head of the plunger 15 which thereby is displaced at the precise instant of commencement of the injection and it remains open as long as injection continues. Displacement of the plunger 15 produces electrical contact with the countercontact 21 which is applied for operating the stroboscopic display through the control circuit indicated generally at A.

In the first form of the invention and as shown in Figs. 1 and 2 a neon light source NT is positioned so as to give illumination of the pointer 8 so that said pointer is illuminated precisely at the commencement of the injection period so that the virtual and apparent position of the pointer in relation to the scale indicates the precise moment of commencement of injection in relation to the pump shaft and permits the pump unit or units to be adjusted until optimum working conditions are secured.

Of course the invention is not limited to the use of a moving pointer and a fixed scale as a rotary scale may be used cooperating with a fixed reference marking or pointer and if desired the neon tube could be operated in such way that instead of being illuminated at the commencement of injection, the neon tube remains operative except upon the closure of the contacts 15, 21 whereupon the tube is extinguished. In this case the stroboscopic display is obtained by a blanking-out action by displaying a shadow or dark area representing the point of commencement of injection.

The control circuit A may if desired be comprised by a conventional thermionic amplifier producing amplified pulses at the instant of closing of the contacts 15, 21. If desired however a cold cathode neon trigger tube light source may be utilised preferably of the tetrode type having an anode, a cold cathode, a screen grid and a trigger electrode or control grid which on the application of a small voltage pulse initiates a glow discharge of the tube which in turn causes a main arc discharge from anode to cathode. A circuit diagram showing the features employed in conjunction with such a tube are shown by way of example on Fig. 4 of the accompanying drawings in which a rectifier circuit R and a smoothing condenser C are fed from a mains transformer T, which also operates an indicator light source L, and supply a neon flash tube NT the cathode $k$ of which is earthed. The anode $a$ is connected through a load $r1$ and potential divider resistors $r2$ and $r3$ supply an appropriate voltage for the screen grid $g2$ of the tube. A condenser $c1$ is connected to the anode and serves to discharge through the anode-cathode path of the tube when the latter is triggered by the application of an appropriate potential to the control grid $g1$. This control potential is obtained through comparatively high value potential divider resistors $r4$, $r5$ connected between the supply line from R and earth. The common point of said resistances is connected to the grid through a grid condenser $c2$ and a grid leak $r6$. The resistor $r5$ is shunted by a condenser $c3$. Said common point is also connected to the contact devices S1, S2 . . . S8 comprised by the contact members 15, 21 of several test injectors. The connection of each contact to the circuit may be controlled by a series of control switches SW.

It will be understood that since the potential divider resistors $r4$, $r5$ are of comparatively high value a comparatively low resistance connection to earth through any of the contact devices S1 to S8 will result in a substantial and immediate change in the potential at the common point of the resistors $r4$, $r5$, which is applied through grid condenser $c2$ to initiate the firing of the neon tube NT by discharging the condenser $c1$. The grid resistor $r6$ allows the grid $r1$ to return to earth potential after each pulse.

In an alternative form of the invention, instead of the pointer 8 being illuminated in relation to the scale ring 9 or the like by means of a stroboscopic light source, the stroboscopic display is obtained by a high voltage spark passing between the pointer and the ring 9 as shown in Fig. 2. The production of such sparks is controlled by the contacts 15, 21 so that the position of the spark in relation to the ring indicates the position of commencement of the ejection from the injector.

The design of the control circuit device A to produce illumination of a normal type of two-electrode discharge light source or to produce sparks capable of passing from the pointer 8 to the scale ring 9 could be readily evolved by those skilled in the art and it has not been thought necessary to describe the detail features of such a circuit, which consists primarily of a voltage amplifier circuit.

In the foregoing it has been assumed that a standard or reference injector I or a plurality of such injectors are utilised for checking the operation of a pump unit P but it should be understood that the features of the present invention are equally applicable for testing injectors, in which case a standard or reference pump or pump unit such as P would be utilised, the injectors being tested in relation to such a pump or unit.

What I claim is:

1. Apparatus for testing a fuel injection pump for an internal combustion engine, said pump having an exposed driving shaft, comprising a fuel injector device fed by said pump, a carrier device adapted to support said injector device, an axially displaceable assembly in said carrier device, means yieldingly urging said assembly against the delivery tip of said fuel injector device, said assembly comprising a pair of interfitting components, one said component being shaped to engage the delivery tip, a plunger slidably supported in said one component, a spring tending yieldingly to press said plunger against the delivery tip, the opposite end of said plunger being adapted to form a first contact element, a second contact element carried by the second interfitting component in a position adapted to engage said former contact on displacement of said plunger, an electrical circuit fed by said first and second contact elements, and stroboscopic means on said pump driving shaft to indicate pump driving shaft positions relatively to delivery from said injector device, said stroboscopic means being energized by said electrical circuit.

2. Apparatus according to claim 1 wherein the plunger is provided with an enlarged head portion adapted to be accommodated in a recess of the one component of the assembly.

3. Apparatus according to claim 2, wherein relief ports are provided in said component opening below the head portion of the plunger.

4. Apparatus according to claim 1, wherein the first named component is provided with an enlarged mouth portion adapted to engage around the delivery tip of the injector nozzle.

5. Apparatus according to claim 4, wherein an indicator is fitted to a moving part of the pump and the contact elements are electrically connected with an amplifier device which controls the illumination of a gaseous discharge device to cause the latter to illuminate the indicator stroboscopically.

6. Apparatus according to claim 1 wherein the carrier device is provided with means for releasably mounting the injector device and is of tubular form, having an opening at the end opposite to that securing the fuel injector device.

7. Apparatus according to claim 1, wherein said stroboscopic means comprises relatively movable spark components on the pump driving shaft and a fixed member, and said electrical circuit includes an amplifier device fed from said contacts to produce a high voltage spark passing between said relatively movable components.

8. Apparatus according to claim 7, wherein said relatively movable components comprise a rotary arm on the pump driving shaft and a fixed indicator ring.

9. Apparatus according to claim 1, wherein said stroboscopic means comprises indicating means on said pump driving shaft and a cold-cathode grid-controlled neon tube light source positioned to illuminate said indicating means.

10. Apparatus according to claim 9, wherein said indicator means comprises a relatively movable scale and indicator for indicating the angular position of commencement of the injection when illuminated by said light source.

References Cited in the file of this patent

UNITED STATES PATENTS

| | | |
|---|---|---|
| 941,053 | Young | Nov. 23, 1909 |
| 1,836,284 | Scheibell | Dec. 15, 1931 |
| 2,192,863 | Hetzel et al. | Mar. 5, 1940 |
| 2,333,261 | Mantz | Nov. 2, 1943 |
| 2,436,680 | Straussler | Feb. 24, 1948 |
| 2,679,560 | Kunzler et al. | May 25, 1954 |
| 2,691,888 | Daulby | Oct. 19, 1954 |

FOREIGN PATENTS

| | | |
|---|---|---|
| 514,508 | Great Britain | Nov. 17, 1939 |